United States Patent
Jung et al.

(10) Patent No.: US 12,282,634 B2
(45) Date of Patent: Apr. 22, 2025

(54) PROCESSOR FOR DETERMINING LEVEL OF RESPONSIVENESS AND ELECTRONIC DEVICE COMPRISING SAME

(71) Applicant: Samsung Electronics Co., Ltd., Suwon-si (KR)

(72) Inventors: Kwanjin Jung, Suwon-si (KR); Daehyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/359,433

(22) Filed: Jul. 26, 2023

(65) Prior Publication Data
US 2023/0367429 A1 Nov. 16, 2023

Related U.S. Application Data

(63) Continuation of application No. PCT/KR2022/000356, filed on Jan. 10, 2022.

(30) Foreign Application Priority Data

Mar. 10, 2021 (KR) .................. 10-2021-0031337

(51) Int. Cl.
*G06F 3/041* (2006.01)
*G06F 3/01* (2006.01)
*G06F 3/042* (2006.01)

(52) U.S. Cl.
CPC ............ *G06F 3/0425* (2013.01); *G06F 3/013* (2013.01); *G06F 3/04186* (2019.05)

(58) Field of Classification Search
CPC .... G06F 3/0425; G06F 3/013; G06F 3/04186; G06F 1/1684; G06F 1/1686;
(Continued)

(56) References Cited

U.S. PATENT DOCUMENTS

2008/0290985 A1 11/2008 Vogedes et al.
2014/0043295 A1 2/2014 Alameh et al.

FOREIGN PATENT DOCUMENTS

EP 2 527 955 A1 11/2012
EP 3629139 A1 * 4/2020 ............ G06F 3/041
(Continued)

OTHER PUBLICATIONS

International Search Report dated Mar. 24, 2022, issued in International Patent Application No. PCT/KR2022/000356.
(Continued)

*Primary Examiner* — Jonathan A Boyd
(74) *Attorney, Agent, or Firm* — Jefferson IP Law, LLP

(57) ABSTRACT

An electronic device is provided. The electronic device includes a sensor unit comprising one or more sensors, a display comprising a touch sensor, and at least one processor for controlling the electronic device, wherein the processor may detect a touch input through the touch sensor, when a touch input is detected, determine whether the touch input is valid on the basis of state information generated through the one or more sensors, when it is determined that the touch input is valid, determine a target level of responsiveness for the touch input from among a plurality of levels on the basis of at least one of the state information and application information about an application being executed by the electronic device, and control the electronic device on the basis of the target level.

20 Claims, 9 Drawing Sheets

(58) Field of Classification Search
CPC .... G06F 1/1694; G06F 1/3215; G06F 1/3231;
G06F 1/3262; G06F 1/3265; G06F
3/0304; G06F 3/03547; G06F 3/038;
G06F 3/0416; G06F 3/005; G06F 3/0346
See application file for complete search history.

(56) References Cited

FOREIGN PATENT DOCUMENTS

| | | | | |
|---|---|---|---|---|
| JP | 2010257012 | * 11/2010 | ............ | G06F 3/041 |
| JP | 2010257012 A | 11/2010 | | |
| JP | 2013211028 | * 10/2013 | ........... | G06F 3/0346 |
| JP | 2013211028 A | 10/2013 | | |
| KR | 10-2005-0061167 A | 6/2005 | | |
| KR | 10-2009-0063455 A | 6/2009 | | |
| KR | 10-2013-0120359 A | 11/2013 | | |
| KR | 10-2015-0022202 A | 3/2015 | | |
| KR | 10-2017-0130385 A | 11/2017 | | |
| KR | 10-1844224 B1 | 4/2018 | | |
| KR | 10-1980915 B1 | 5/2019 | | |
| KR | 10-2019-0064637 A | 6/2019 | | |
| KR | 10-20200113021 A | 10/2020 | | |
| WO | 2014/021499 A1 | 2/2014 | | |

OTHER PUBLICATIONS

Extended European Search Report dated May 15, 2024, issued in European Patent Application No. 22767297.9.

\* cited by examiner

PROCESSOR FOR DETERMINING LEVEL OF RESPONSIVENESS AND ELECTRONIC DEVICE COMPRISING SAME

CROSS-REFERENCE TO RELATED APPLICATION(S)

This application is a continuation application, claiming priority under § 365(c), of an International application No. PCT/KR2022/000356, filed on Jan. 10, 2022, which is based on and claims the benefit of a Korean patent application number 10-2021-0031337, filed on Mar. 10, 2021, in the Korean Intellectual Property Office, the disclosure of which is incorporated by reference herein in its entirety.

BACKGROUND

1. Field

The disclosure relates to an electronic device for determining responsiveness of the electronic device.

2. Description of Related Art

When system resources are used to improve the touch responsiveness of a mobile terminal, even in a situation where responsiveness to touch, such as an incorrect touch input, is not required, heat generation and battery discharge issues may occur as the system resources of the mobile terminal are used when a touch operation occurs.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that determines a level of responsiveness to a touch input.

Additional aspects will be set forth in part in the description which follows and, in part, will be apparent from the description, or may be learned by practice of the presented embodiments.

According to various embodiments, an electronic device includes a sensor portion including one or more sensors, a display module including a touch sensor, and at least one processor configured to control the electronic device. The processor is configured to sense a touch input through the touch sensor, determine whether the touch input is valid based on state information generated through the one or more sensors when the touch input is sensed, when it is determined that the touch input is valid, determine a target level of responsiveness to the touch input among a plurality of levels based on at least one of the state information and application information on an application executed by the electronic device, and control the electronic device based on the target level.

According to various embodiments, a method, performed by an electronic device, of controlling an electronic device includes sensing a touch input through a touch sensor, determining whether the touch input is valid based on state information generated through one or more sensors when the touch input is sensed, when it is determined that the touch input is valid, determining a target level of responsiveness to the touch input among a plurality of levels based on at least one of the state information and application information on an application executed by the electronic device, and controlling the electronic device based on the target level.

According to various embodiments, an electronic device that determines a level of responsiveness to a touch input may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
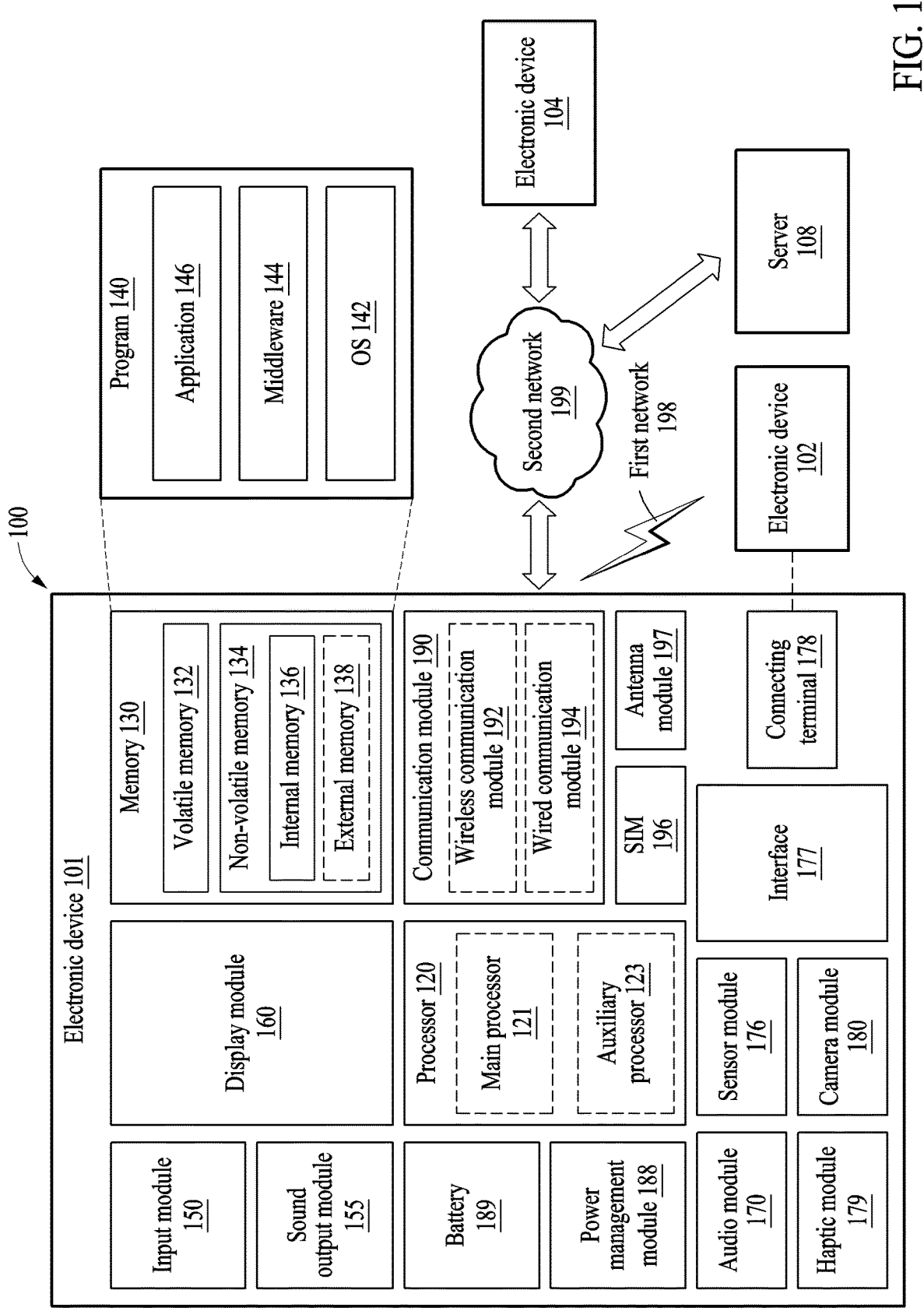
FIG. 1 is a block diagram illustrating an electronic device in a network environment according to an embodiment of the disclosure.

FIG. 1 is a block diagram illustrating an electronic device in a network environment according to an embodiment of the disclosure.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented as separate from, or as part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., an NPU) may include a hardware structure specified for artificial intelligence model processing. An artificial intelligence model may be generated through machine learning. Such learning may be performed, for example, by the electronic device 101 in which an artificial intelligence model is executed, or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The artificial intelligence model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to sense a touch, or a pressure sensor adapted to measure the intensity of force incurred by the touch.

The audio module 170 may convert a sound into an electrical signal and vice versa. According to an embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a PCB, an RFIC disposed on a first surface (e.g., the bottom surface) of the PCB or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed at the electronic device 101 may be executed at one or more of external electronic devices (e.g., the external electronic devices 102 and 104, or the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to the embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B or C", "at least one of A, B and C", and "at least one of A, B, or C", may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if a component (e.g., a first component) is referred to, with or without the term "operatively" or "communicatively", as "coupled with", "coupled to", "connected with", or "connected to" another component (e.g., a second component), it means that the component may be coupled with the other component directly (e.g., by wire), wirelessly, or via a third component.

As used in connection with embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 2:
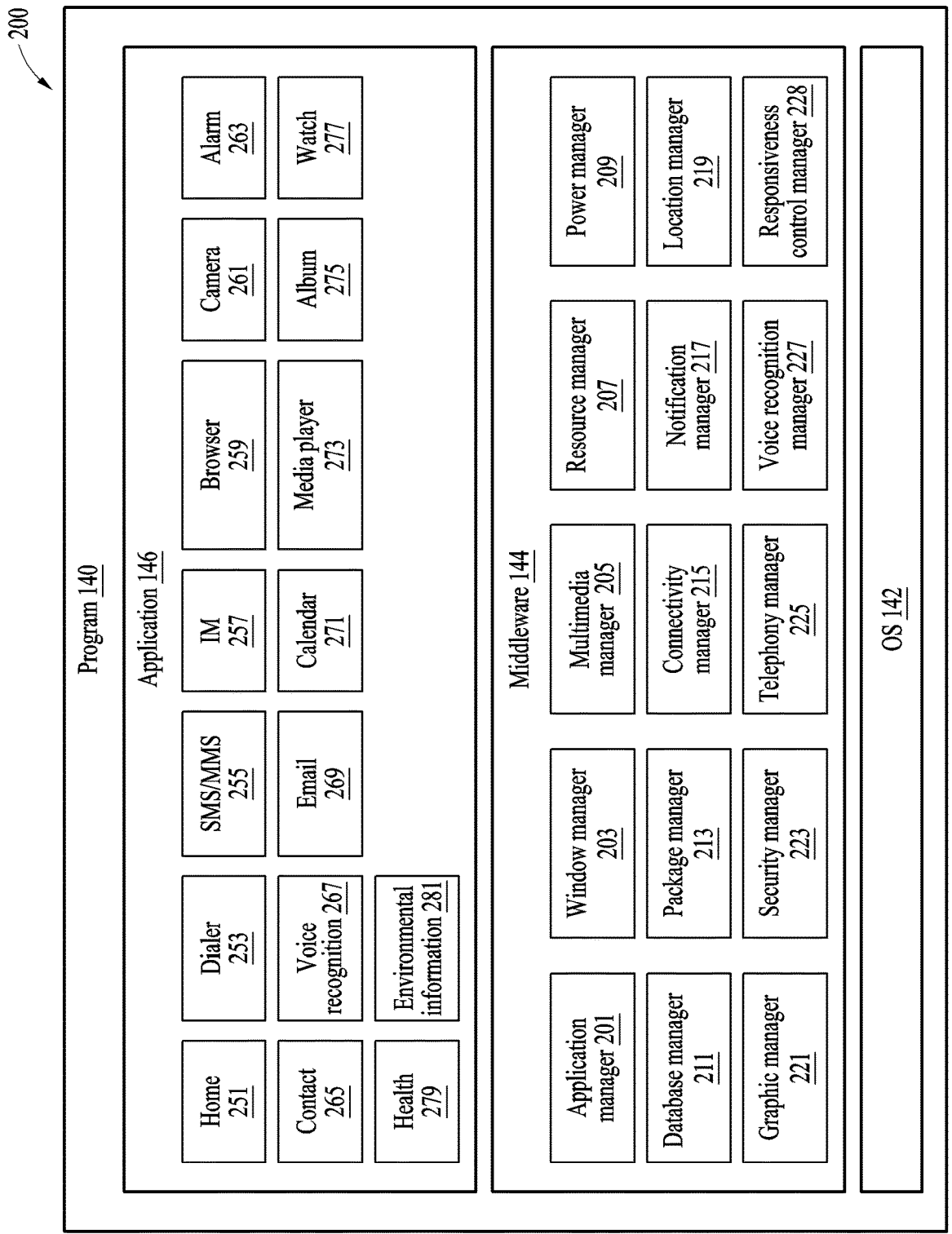
FIG. 2 is a block diagram illustrating a program according to an embodiment of the disclosure.

FIG. 2 is a block diagram illustrating a program according to an embodiment of the disclosure.

According to an embodiment, the program 140 described above with reference to FIG. 1 may include an OS 142 to control one or more resources of the electronic device 101, middleware 144, or an application 146 executable by the OS 142. The OS 142 may include, for example, Android™, iOS™, Windows™, Symbian™ Tizen™, or Bada™. At least part of the program 140, for example, may be preloaded on the electronic device 101 during manufacture, or may be downloaded from or updated by an external electronic device (e.g., the electronic device 102 or 104, or the server 108) during use by a user.

Referring to FIG. 2, in a memory 200, the OS 142 may control management (e.g., allocation or deallocation) of one or more system resources (e.g., a process, a memory, or a power source) of the electronic device 101. The OS 142 may additionally or alternatively include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, a voice recognition manager 227, or a responsiveness control manager 228.

The application manager 201, for example, may manage the life cycle of the application 146.

The window manager 203, for example, may manage one or more graphical user interface (GUI) resources that are used on a screen.

The multimedia manager 205, for example, may identify one or more formats to be used to play media files and may encode or decode a corresponding one of the media files using a codec appropriate for a corresponding format selected from the one or more formats.

The resource manager 207, for example, may manage source code of the application 146 or a memory space of the memory 130.

The power manager 209, for example, may manage the capacity, temperature, or power of the battery 189 and may determine or provide related information to be used for the operation of the electronic device 101 based on at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146.

The package manager 213, for example, may manage installation or update of an application that is distributed in the form of a package file.

The connectivity manager 215, for example, may manage a wireless connection or a direct connection between the electronic device 101 and the external electronic device.

The notification manager 217, for example, may provide a function to notify a that a specified event occurred (e.g., an incoming call, a message, or an alert).

The location manager 219, for example, may manage location information on the electronic device 101.

The graphic manager 221, for example, may manage one or more graphic effects to be offered to the user or a user interface related to the one or more graphic effects. For example, the graphic manager 221 may include Surface-Flinger.

The security manager 223, for example, may provide system security or user authentication.

The telephony manager 225, for example, may manage a voice call function or a video call function provided by the electronic device 101.

The voice recognition manager 227, for example, may transmit a user's voice data to the server 108 and may receive, from the server 108, a command corresponding to a function to be executed on the electronic device 101 based on at least in part on the voice data, or text data converted based at least in part on the voice data.

The responsiveness control manager 228, for example, may receive a sensor value of a corresponding sensor from one or more sensors of the sensor module 176 of the electronic device 101, generate state information representing a current state of the electronic device 101 based on the sensor value, determine whether a touch input is valid based on the state information, and determine a responsiveness level to control the electronic device 101 according to whether the touch input is valid.

According to an embodiment, the middleware 144 may dynamically delete some existing components or add new components. According to an embodiment, at least part of the middleware 144 may be included as a part of the OS 142 or implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of an external electronic device that communicates with the electronic device 101, or some component (e.g., a display module or a camera module of the external electronic device) of the external electronic device. The device management application may additionally or alternatively support installation, delete, or update of an application running on the external electronic device.

Figure 3:
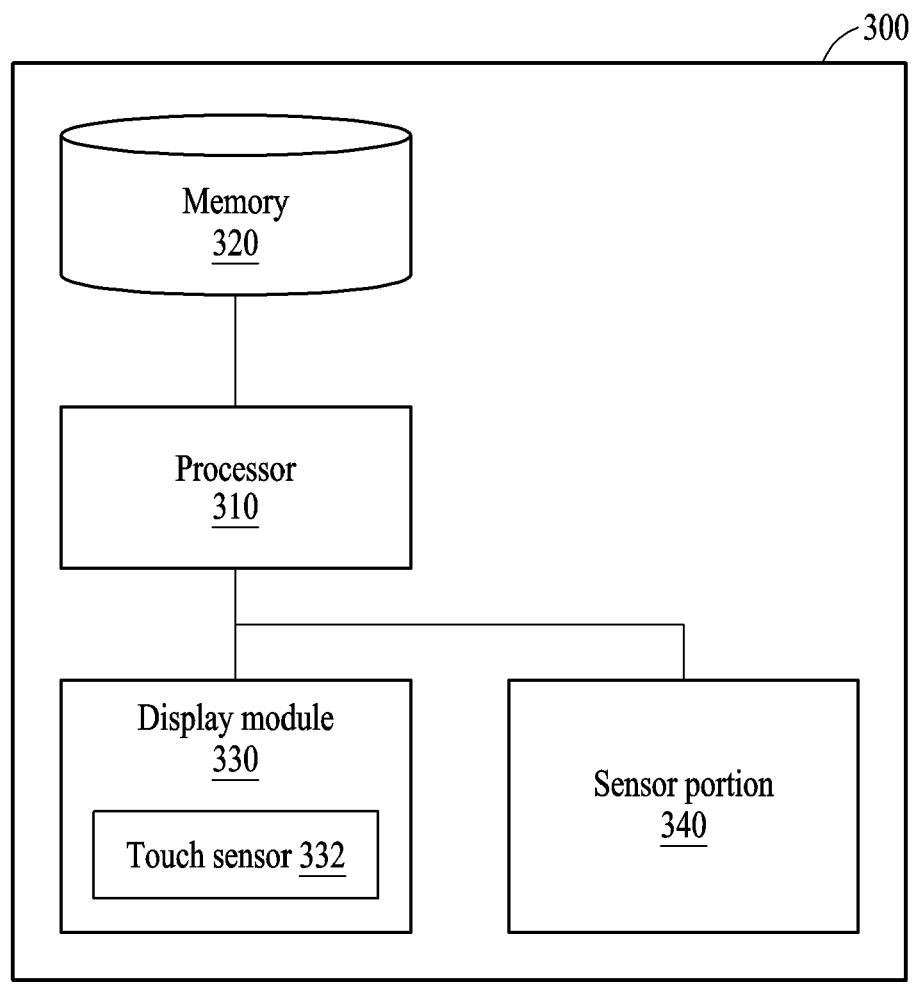
FIG. 3 is a block diagram of an electronic device according to an embodiment of the disclosure.

FIG. 3 is a block diagram of an electronic device according to an embodiment of the disclosure.

Referring to FIG. 3, an electronic device 300 (e.g., the electronic device 101 of FIG. 1) may include a processor 310 (e.g., the processor 120 of FIG. 1), a memory 320 (e.g., the memory 130 of FIG. 1), a display module 330 (e.g., the display module 160 of FIG. 1), and a sensor portion 340 (e.g., the sensor module 176 of FIG. 1).

The processor 310, like the processor 120, may include a main processor 121 (e.g., a CPU, or an AP) or the auxiliary processor 123 (e.g., a GPU, an NPU, an ISP, a digital signal processor (DSP), a sensor hub processor, or a CP) that is operable independently of, or in conjunction with the main processor 121. For example, when the processor 310 includes a main processor and an auxiliary processor, the auxiliary processor may be adapted to consume less power than the main processor or to be specific to a specified function. The auxiliary processor may be implemented separately from the main processor or as a part of the main processor.

The memory 320 may store a variety of data used by at least one component (e.g., the processor 310) of the electronic device 300. The data may include, for example, software (e.g., the program 140 of FIG. 1) and input data or output data for a command related thereto.

A program (e.g., the program 140 of FIG. 1) may be stored as software in the memory 320 and may include, for example, an OS (e.g., the OS 142 of FIG. 1), middleware (e.g., the middleware 144 of FIG. 1), or an application (e.g., the application 146 of FIG. 1).

According to an aspect, one or more applications may be stored or installed in the memory 320 by a user of the electronic device 300. An application installed in the electronic device 300 may include, for example, a game application and a camera application but is not limited thereto and may include applications for various purposes.

The display module 330 may visually provide, on a display screen, information to the outside of the electronic device 300. For example, when information to be provided is changed (or updated), the display screen may also be changed. According to an embodiment, the display module 330 may include a touch sensor 332 adapted to sense a touch, or a pressure sensor adapted to measure the intensity of a force incurred by the touch.

The sensor portion 340 may include, for example, at least one of a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. Each sensor of the sensor portion 340 may generate a sensor value by sensing the environment of the electronic device 300. The sensor values generated by the sensors may form state information.

The electronic device 300 may receive a touch input from a user through the touch sensor 332 and provide, on a display screen, a result generated by processing the touch input to the user. Hardware (or a system) resources of the electronic device 300 may be used to process the touch input, and when the hardware resources are used, power of a battery (e.g., the battery 189 of FIG. 1) of the electronic device 300 may be reduced.

According to an aspect, an unintentional touch of the user may be input to the electronic device 300 while the user is not actually using the electronic device 300. When the electronic device 300 uses the hardware resources even for the unintentional touch input of the user, unwanted battery discharge may occur. To prevent unwanted power consumption of a battery by the user, it is determined whether the touch input is valid, and when the touch input is not valid, the touch input may not be processed.

According to an aspect, the level of responsiveness of the electronic device 300 to a touch input may be determined according to a current state of the electronic device 300 and the electronic device 300 may process the touch input based on the determined level. For example, the determined level of responsiveness may be one of a high-performance mode, a mid-performance mode, a low-performance mode, and a sustain-performance mode. For each performance mode, the degree to which hardware resources of the electronic device 300 are intensively used may be allocated in advance. For example, a higher operating clock of the processor 310 may be allocated to the high-performance mode than to other performance modes. The hardware resources of the electronic device 300 may be efficiently used by determining the level of responsiveness to the touch input based on the current state of the electronic device 300.

A method of determining the level of responsiveness to the touch input and controlling the electronic device 300 based on the determined level of responsiveness is described in detail below with reference to FIGS. 4 to 9.

According to an embodiment, the electronic device 300 may include the sensor portion 340 including one or more sensors, the display module 330 including the touch sensor 332, and at least one processor 310 configured to control the electronic device 300, and the processor 310 may sense a touch input through the touch sensor 332, when the touch input is sensed, determine whether the touch input is valid based on state information generated through one or more sensors, when it is determined that the touch input is valid, determine a target level of responsiveness to the touch input among a plurality of levels based on at least one of the state information and application information on an application executed by the electronic device 300, and control the electronic device 300 based on the target level.

According to an embodiment, the electronic device 300 may be a mobile communication terminal.

Figure 4:
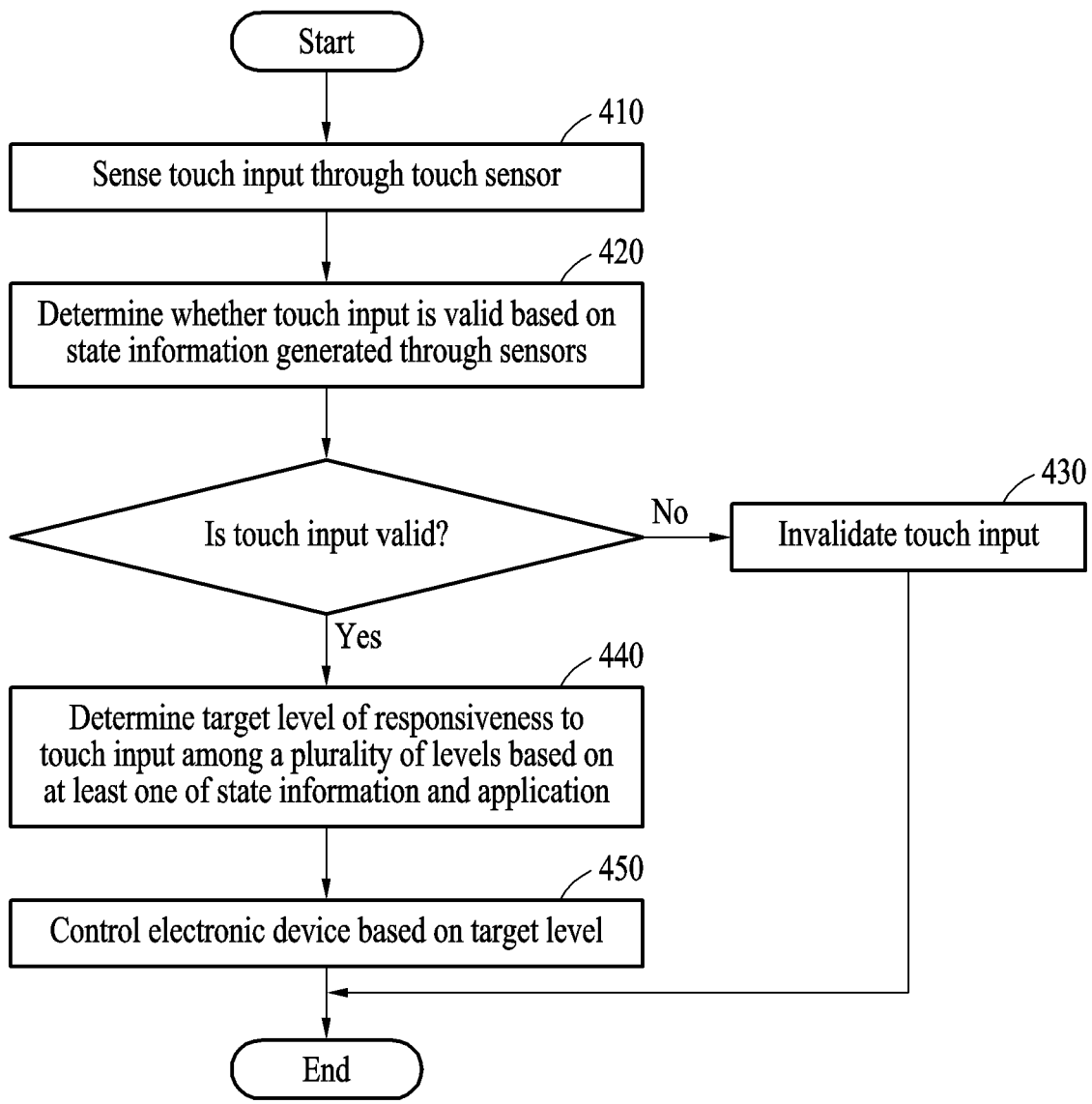
FIG. 4 is a flowchart illustrating a method of controlling an electronic device based on a determined level of responsiveness, according to an embodiment of the disclosure.

FIG. 4 is a flowchart illustrating a method of controlling an electronic device based on a determined level of responsiveness according to an embodiment of the disclosure.

Referring to FIG. 4, operations 410 to 450 may be performed by an electronic device (e.g., the electronic device 101 of FIG. 1 or the electronic device 300 of FIG. 3).

In operation 410, a processor (e.g., the processor 120 of FIG. 1 or the processor 310 of FIG. 3) of an electronic device may sense a touch input of a user through a touch sensor (e.g., the touch sensor 332 of FIG. 3). For example, the processor may sense the touch input by receiving a touch event from the touch sensor.

In operation 420, the processor may determine whether the touch input is valid based on state information generated through one or more sensors (e.g., the sensors of the sensor module 176 of FIG. 1 or the sensors of the sensor portion 340 of FIG. 3).

According to an aspect, the touch input may be generated by an actual input intention of the user or may alternatively be generated by an accidental touch the user does not intend. The processor may first determine a current state of the electronic device based on the state information to determine whether the touch input is validly generated. For example, the current state of the electronic device may include a state of the electronic device itself and a state of the user using the electronic device. For example, the current state of the electronic device itself may include an active state, an inactive state, a state in a pocket, a state in a dark place, and a state in a theater. For example, the state of the user may include a sitting state, a lying state, a walking state, a running state, and a driving state.

A method of determining whether the touch input is valid based on the current state of the electronic device is described in detail below with reference to FIGS. 5 and 6.

According to an embodiment, the processor 310 may determine whether the touch input is valid further based on touch inputs received prior to the touch input. For example, even when it may be determined that the touch input is not valid based on the current state, it is finally determined that the touch input is valid when touch inputs are continuously sensed.

When it is determined that the touch input is not valid, operation 430 may be performed and when it is determined that the touch input is valid, operation 440 may be performed.

In operation 430, the processor may invalidate the sensed touch input. When the touch input is invalidated, the processor may not use hardware resources for processing the touch input.

In operation 440, the processor may determine a target level of responsiveness to the touch input among a plurality of preset levels based on at least one of the state information and application information on an application executed by the electronic device. For example, the plurality of preset levels may include a high-performance mode, a mid-performance mode, a low-performance mode, and a sustain-performance mode, but the disclosure is not limited thereto.

According to an aspect, the processor may determine the target level of responsiveness to the touch input based on the state information. For example, the target level may be determined to correspond to the current state of the electronic device determined based on the state information. Hereinafter, a method of determining the target level based on the current state of the electronic device is described in detail with reference to FIG. 7.

According to an aspect, the processor may determine the target level of responsiveness based on the application information. For example, a high level of responsiveness may be determined for applications (e.g., game applications) that require high data throughput (or performance (e.g., high frame per second (FPS)) that requires a fast output of a result screen corresponding to a user input) and a low level of responsiveness may be determined for applications executable with low data throughput.

According to an aspect, the processor may determine the target level of responsiveness by considering both the current state and the application information of the electronic device. For example, a level having higher responsiveness may be determined as the target level, among a first level determined for the current state and a second level determined for the application information, so that the user does not feel uncomfortable using the electronic device. For example, even when the electronic device provides high responsiveness, in a situation where the user may not feel the responsiveness (e.g., in a running state), a level having lower responsiveness may be determined as the target level among the first level determined for the current state and the second level determined for the application information.

In operation 450, the processor may control the electronic device based on the target level. For example, the processor may control the electronic device by adjusting the usage of hardware resources of the electronic device to correspond to the target level. For example, the hardware resources may include a CPU, GPU, NPU, ISP, DSP, bus, or battery. The current consumed by the electronic device may be controlled by adjusting the usage of hardware resources.

According to an aspect, when a plurality of cores of the processor is included, some cores allocated to the target level among the plurality of cores may be used to process a task for controlling the electronic device. For example, when the target level corresponds to a high-performance mode, a high-performance core among the plurality of cores may be controlled to be used. For example, when the target level corresponds to a low-performance mode, a core operating with low power among the plurality of cores may be controlled to be used.

According to another embodiment, the processor 310 may control the electronic device 300 by adjusting the usage of the hardware resources of the electronic device 300 to correspond to the target level.

Figure 5:
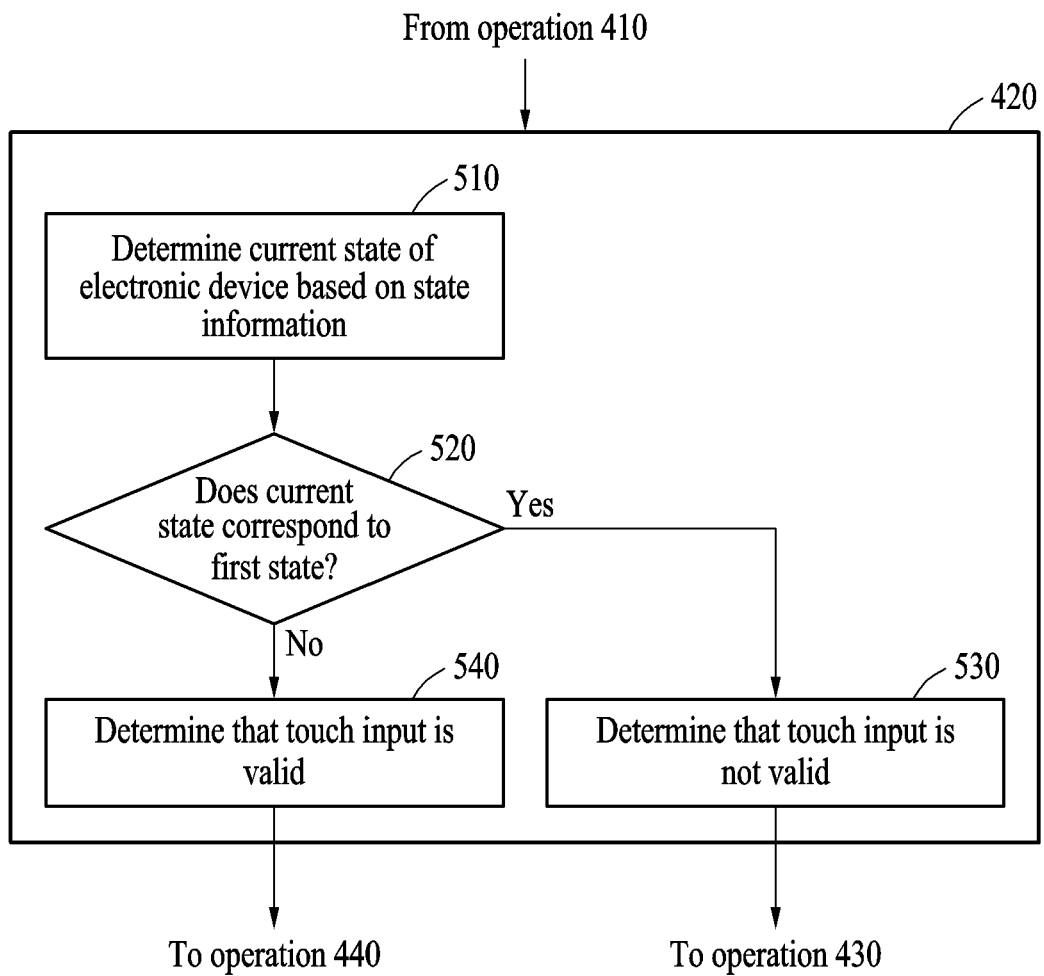
FIG. 5 is a flowchart of a method of determining whether a touch input is valid, according to an embodiment of the disclosure.

FIG. 5 is a flowchart of a method of determining whether a touch input is valid, according to an embodiment of the disclosure.

According to an embodiment, operation 420 described with reference to FIG. 4 may include operations 510 to 540. Operations 510 to 540 may be performed by an electronic device (e.g., the electronic device 101 of FIG. 1 or the electronic device 300 of FIG. 3).

Referring to FIG. 5, in operation 510, a processor (e.g., the processor 120 of FIG. 1 or the processor 310 of FIG. 3) of the electronic device may determine a current state of the electronic device based on state information received from one or more sensors of a sensor portion (e.g., the sensor module 176 of FIG. 1 or the sensor portion 340 of FIG. 3).

According to an aspect, the sensor portion may include one or more of an acceleration sensor and a gyro sensor, and the state information may include one or more of a sensor value of the acceleration sensor and a sensor value of the gyro sensor. The processor may determine the current state of the electronic device based on the state information including the sensor value of the acceleration sensor and the sensor value of the gyro sensor. For example, the current state determined based on the state information may represent a state of a user using the electronic device as a first current state. The first current state may be a walking state, a running state, a sitting state, a lying state, or a driving state.

According to an aspect, the sensor portion may further include one or more of a proximity sensor and an illuminance sensor, and the state information may further include one or more of a sensor value of the proximity sensor and a sensor value of the illuminance sensor. The processor may determine the current state of the electronic device based on the state information including the sensor value of the proximity sensor and the sensor value of the illuminance sensor. For example, the current state determined based on the state information may represent a state of the electronic device itself as a second current state. The second current state may be an active state, an inactive state, a state in a bright place, a state in a pocket, a state in a dark place, or a state in a theater.

According to an aspect, the processor may determine a final current state based on the determined first current state and the determined second current state. For example, a state that may reflect both the first current state and the second current state may be determined as the current state.

According to an aspect, although operation 510 is provided as shown in FIG. 5 as being performed after operation 410 is performed, operation 510 is not necessarily performed after operation 410 is performed and according to an embodiment, operation 510 may be performed before operation 410 is performed or may be performed independently and in parallel with operation 410.

In operation 520, the processor may determine whether the current state corresponds to a preset first state. For example, the preset first state may be a state in which it is difficult or logically impossible for the user to input a touch.

In operation 530, the processor may determine that the touch input is not valid when the current state corresponds to the preset first state.

In operation 540, the processor may determine that the touch input is valid when the current state does not correspond to the preset first state.

According to an embodiment, the sensor portion 340 may include one or more of the acceleration sensor and the gyro sensor, the state information may include one or more of the sensor value of the acceleration sensor and the sensor value of the gyro sensor, and the processor 310 may determine the current state of the electronic device 300 based on the state information, and when the current state corresponds the preset first state, may determine that the touch input is not valid.

According to an embodiment, the sensor portion 340 may further include one or more of the proximity sensor and the illuminance sensor, and the state information may further include one or more of the sensor value of the proximity sensor and the sensor value of the illuminance sensor.

Figure 6:
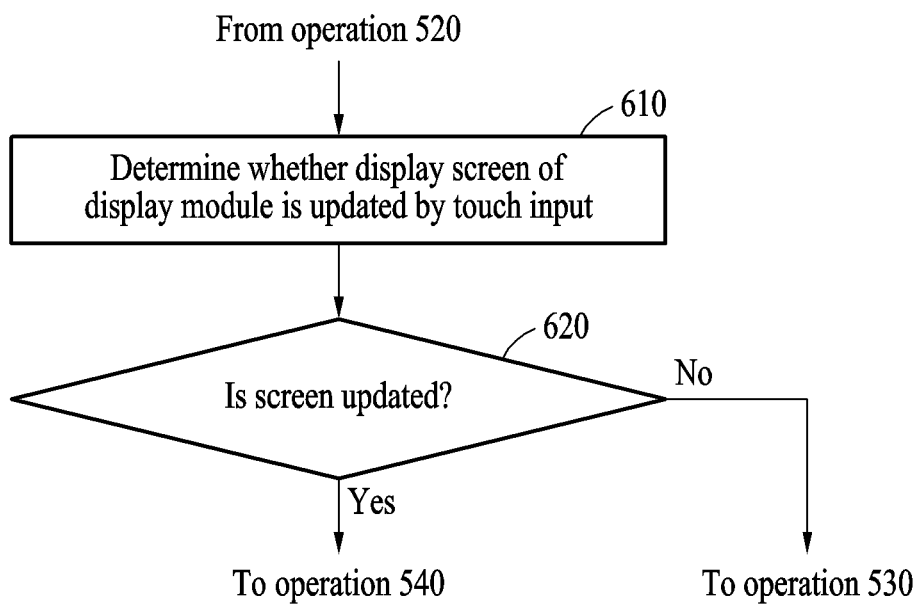
FIG. 6 is a flowchart of a method of determining whether a touch input is valid based on whether a display screen is updated, according to an embodiment of the disclosure.

FIG. 6 is a flowchart of a method of determining whether a touch input is valid based on whether a display screen is updated, according to an embodiment of the disclosure.

According to an embodiment, operation 420 described with reference to FIGS. 4 and 5 may further include operations 610 and 620. Operations 610 and 620 may be performed by an electronic device (e.g., the electronic device 101 of FIG. 1 or the electronic device 300 of FIG. 3). When it is determined that the current state corresponds to the first state in operation 520 of FIG. 5, operation 610 may be performed.

Referring to FIG. 6, in operation 610, a processor (e.g., the processor 120 of FIG. 1 or the processor 310 of FIG. 3) of the electronic device may determine whether a display screen of a display module (e.g., the display module 160 of FIG. 1 or the display module 330 of FIG. 3) is updated by a touch input. For example, the processor may determine whether the display screen is updated by receiving an event representing whether the display screen is updated from a graphic manager (e.g., the graphic manager 221 of FIG. 2).

According to an aspect, a user may input a touch to the electronic device with an intention of updating a progress status of an application running on the electronic device but on the contrary, may touch the electronic device unintentionally. For example, the user may touch an area of a display not related to the progress of the application. For example, the area of the display not related to the progress of the application may be an area in which a user interface (UI) does not appear. When the user touches the UI, the progress status of the application is updated, so the display screen may be updated and when the user touches an area where there is no UI, the display screen may not be updated as the progress status of the application is not updated.

When it is determined that the display screen is updated, operation 540 of FIG. 5 may be performed and when it is determined that the display screen is not updated, operation 530 of FIG. 5 may be performed.

According to an embodiment, when the current state does not correspond to the preset first state, the processor 310 may determine whether the display screen of the display module 330 is updated by the touch input and when the display screen is not updated, may determine that the touch input is not valid.

Figure 7:
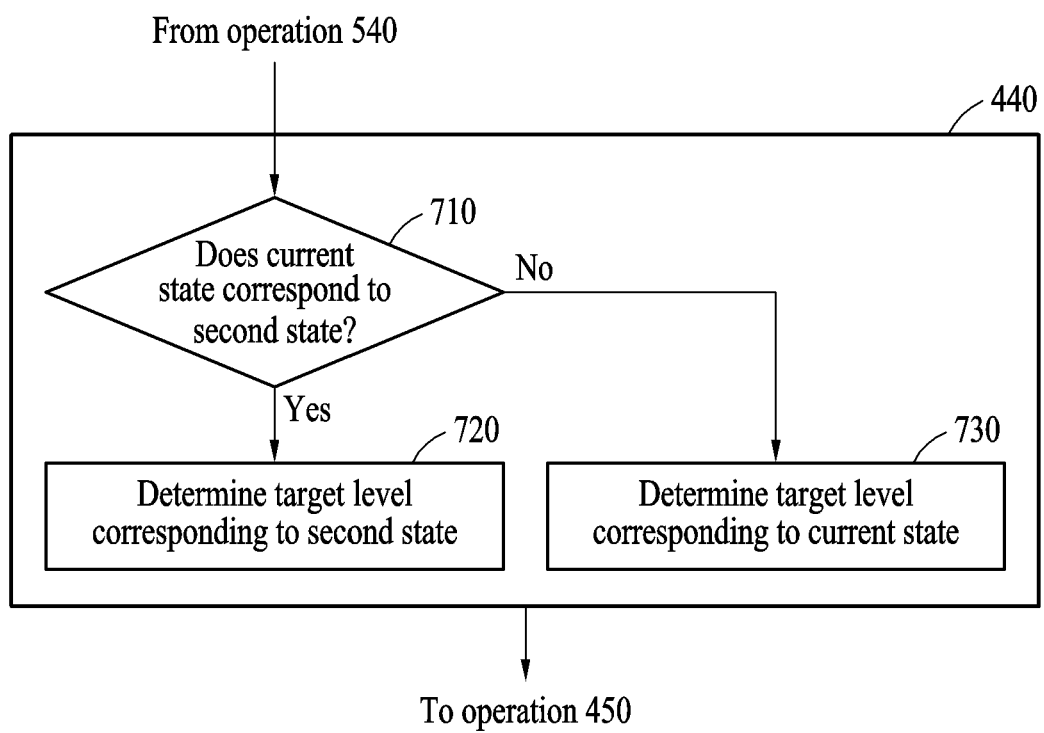
FIG. 7 is a flowchart of a method of determining a target level based on a current state of an electronic device, according to an embodiment of the disclosure.

FIG. 7 is a flowchart of a method of determining a target level based on a current state of an electronic device, according to an embodiment of the disclosure.

According to an embodiment, operation 440 described with reference to FIG. 4 may further include operations 710 to 730. Operations 710 to 730 may be performed by an electronic device (e.g., the electronic device 101 of FIG. 1 or the electronic device 300 of FIG. 3). Operation 710 may be performed when it is determined that a touch input is valid.

Referring to FIG. 7, in operation 710, a processor (e.g., the processor 120 of FIG. 1 or the processor 310 of FIG. 3) of the electronic device may determine whether a current state of the electronic device corresponds to a preset second state. For example, a plurality of second states set in advance, and the processor may determine whether the current state of the electronic device corresponds to one of the plurality of second states.

According to an aspect, the preset second state may be a state corresponding to a combination of the first current state described with reference to FIG. 5 and the second current state. For example, the second state may be a state in which a user is sitting (the first current state) and in a bright place (the second current state). In another example, the second state may be a state in which the user is walking (the first current state) and in a dark place (the second current state).

According to an aspect, the preset second state may be a state corresponding to the first current state described with reference to FIG. 5 or the second current state and is not limited to the described embodiment.

According to an aspect, the current state may further include whether high performance is required for the execution of an application.

Operation 720 may be performed when the current state of the electronic device corresponds to the preset second state and operation 730 may be performed when the current state does not correspond to the second state.

In operation 720, the processor may determine a target level corresponding to the second state. For example, a level corresponding to the second state may be preset.

According to an aspect, when the current state is a state in which the user is sitting (the first current state) and in a bright place (the second current state) and the second state corresponding to the current state is preset, a level associated with the second state may be determined as the target level for the current state.

In operation 730, when the current state of the electronic device does not correspond to the preset second state, the processor may determine the target level corresponding to the current state. Operation 730 may be an operation for processing an exception when the current state of the electronic device does not correspond to a plurality of preset second states.

According to an aspect, the processor may determine the target level based on at least one of the first current state and the second current state of the current state of the electronic device. For example, a higher level among a level associated with the first current state and a level associated with the second current state may be determined as the target level.

According to an aspect, the processor may determine the target level based on application information. For example, when high performance is required for the execution of an application, the target level may be determined as a level corresponding to a high-performance mode.

According to an embodiment, when it is determined that the touch input is valid and the current state corresponds to the preset second state, the processor 310 may determine the target level corresponding to the second state among a plurality of levels.

Figure 8:
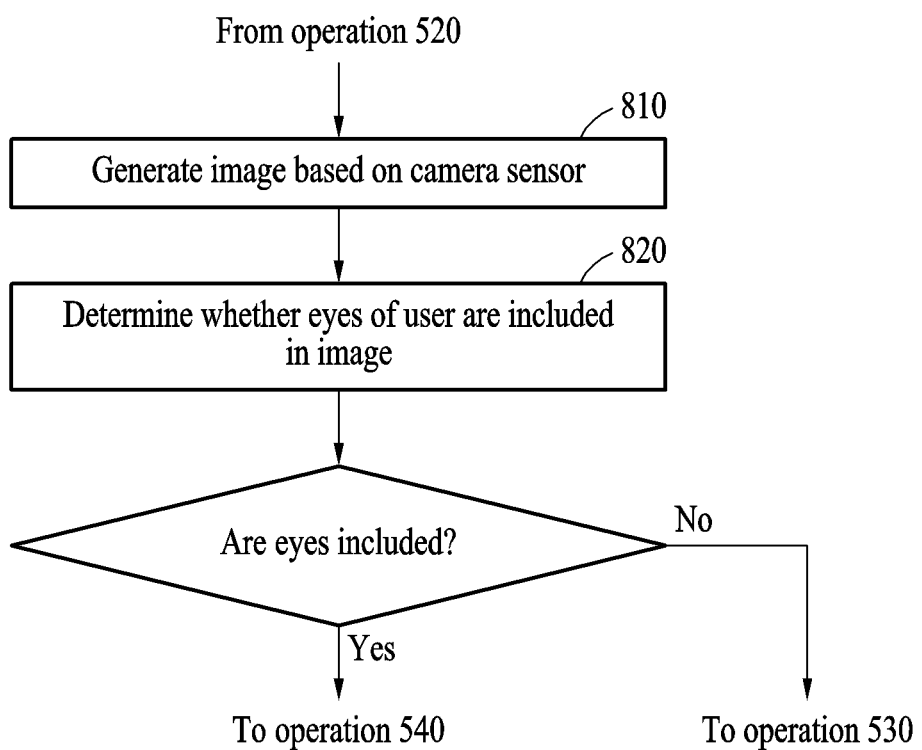
FIG. 8 is a flowchart of a method of determining whether a touch input is valid based on whether the eyes of a user are included in an image, according to an embodiment of the disclosure.

FIG. 8 is a flowchart of a method of determining whether a touch input is valid based on whether the eyes of a user are included in an image, according to an embodiment of the disclosure.

According to an embodiment, operation 420 described with reference to FIGS. 4 and 5 may further include operations 810 and 820. Operations 810 and 820 may be performed by an electronic device (e.g., the electronic device 101 of FIG. 1 or the electronic device 300 of FIG. 3). After operation 520 described with reference to FIG. 5 is performed, operations 810 and 820 may be further performed. Operations 810 and 820 may be performed when it is determined that the current state corresponds to the first state in operation 520.

Referring to FIG. 8, in operation 810, a processor (e.g., the processor 120 of FIG. 1 or the processor 310 of FIG. 3) of the electronic device may generate an image based on a camera sensor (e.g., the camera module 180 of FIG. 1) of the electronic device. The image may be used to determine whether a user of the electronic device intentionally inputs a touch.

In operation 820, the processor may determine whether the eyes of the user are included in the image. The including of the eyes of the user in the image may be interpreted as meaning that a touch is input while the user is looking at the electronic device.

When the eyes of the user are included in the image, operation 540 of FIG. 5 may be performed and when the eyes of the user are not included in the image, operation 530 of FIG. 5 may be performed.

According to an aspect, since the execution of operations 810 and 820 uses additional hardware resources of the electronic device, functions according to operations 810 and 820 may be limitedly used. For example, operations 810 and 820 may be performed only when the use of the functions is permitted by the user.

According to an embodiment, the electronic device 300 may further include a camera sensor, and the processor 310 may determine the current state of the electronic device based on state information, when the current state corresponds to the preset first state, may generate an image based on the camera sensor, may determine whether the eyes of the user are included in the image, and when the eyes of the user are included in the image, may determine that a touch input is valid.

Figure 9:
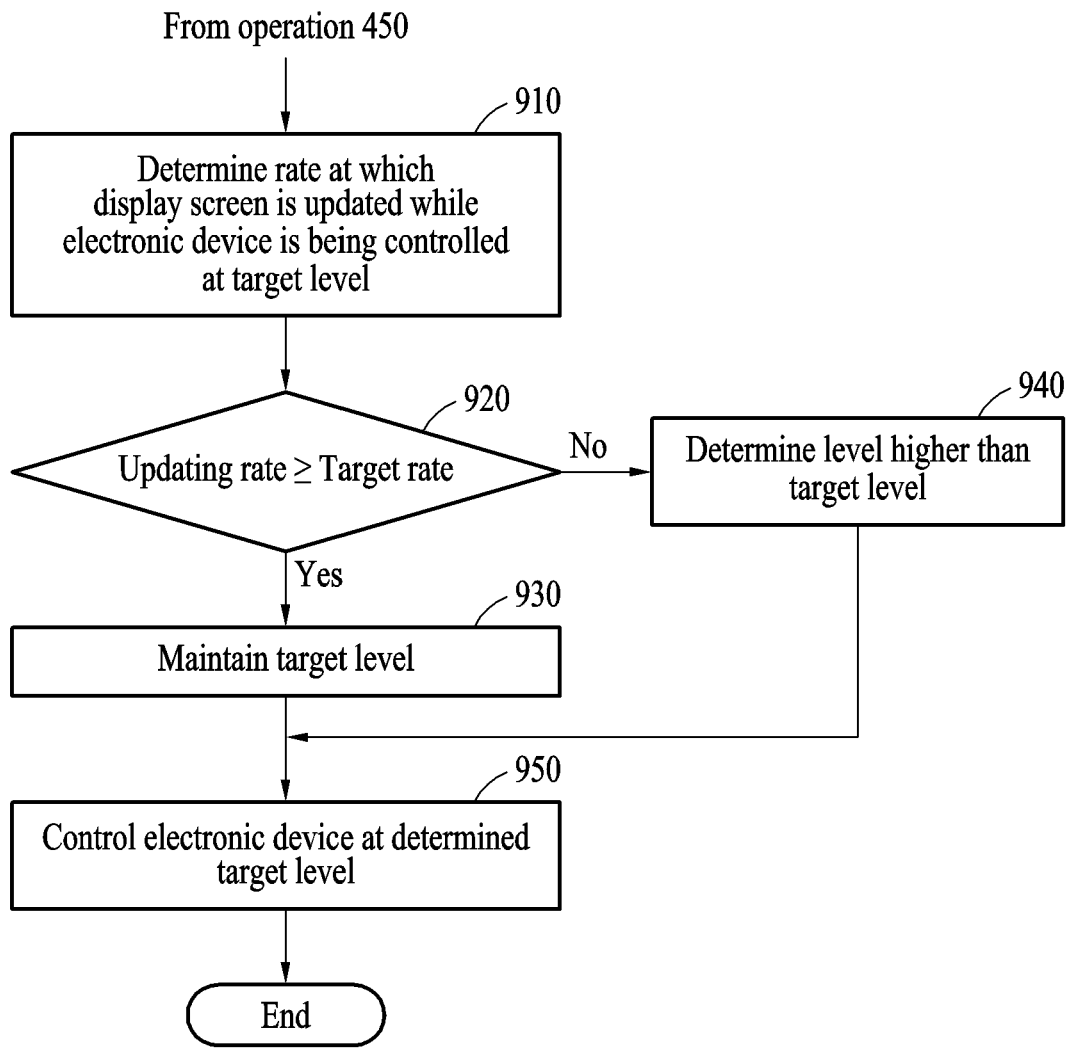
FIG. 9 is a flowchart of a method of re-determining a level of responsiveness based on a rate at which a display screen is updated, according to an embodiment of the disclosure.

FIG. 9 is a flowchart of a method of re-determining a level of responsiveness based on a rate at which a display screen is updated, according to an embodiment of the disclosure.

According to an embodiment, operations 910 to 950 may be further performed after operation 450 provided with reference to FIG. 4 is performed. Operations 910 to 950 may be performed by an electronic device (e.g., the electronic device 101 of FIG. 1 or the electronic device 300 of FIG. 3).

Referring to FIG. 9, in operation 910, a processor (e.g., the processor 120 of FIG. 1 or the processor 310 of FIG. 3) of the electronic device may determine a rate at which a display screen is updated while the electronic device is being controlled at a target level. For example, the processor may determine the rate at which the display screen is updated by receiving an event representing that the display screen is updated from a graphic manager (e.g., the graphic manager 221 of FIG. 2). For example, the updating rate of the display screen may be FPS.

According to an aspect, the updating rate of the display screen may vary depending on the complexity of a view, the complexity of a graphic object, a blur setting, or a set resolution in the display screen. For example, the updating rate of the display screen may decrease as the more complex the view, the more complex the graphic object, or the higher the set resolution.

In operation 920, the processor may determine whether the updating rate is greater than or equal to a preset target rate. For example, the target rate may be previously set according to a basic set rate for the electronic device or a set rate for an application being executed. When a plurality of set rates is identified, the highest set rate may be determined as the target rate.

Operation 930 may be performed when the updating rate is greater than or equal to the preset target rate and operation 940 may be performed when the updating rate is less than the preset target rate.

In operation 930, the processor may maintain the target level when the updating rate is greater than or equal to the preset target rate. The fact that the updating rate is greater than or equal to the preset target rate may mean that a current target level for controlling the electronic device is an appropriate control level.

According to an aspect, when the updating rate is greater than or equal to the preset target rate, the processor may maintain a current first level or adjust the target level to a second level that is lower than the first level. For example, when the difference (e.g., a margin) between the updating rate and the target rate is greater than a preset threshold, the target level may be adjusted to the second level that is lower than the first level.

In operation 940, the processor may determine a level higher than the current target level as a new target level when the updating rate is less than the preset target rate. The fact that the updating rate is less than the preset target rate may mean that the current target level for controlling the electronic device is an inappropriate control level. When the control level is inappropriate, a user may feel uncomfortable using the electronic device. The control level of the electronic device may increase to prevent inconvenience of the user.

In operation 950, the processor may control the electronic device at the determined target level. The description of operation 450 provided with reference to FIG. 4 may be similarly applied to the description of operation 950.

According to an aspect, operations 910 to 950 may be repeatedly performed until a new command or new touch input is received.

According to an embodiment, the processor 310 may determine the rate at which the display screen of the display module 330 is updated while the electronic device 300 is controlled at the target level and may control the electronic device 300 at a level higher than the target level when the rate at which the display screen (i.e., the display module 330) is updated is less than the preset target rate.

According to an embodiment, the target rate may be associated with an application being executed by the electronic device 300 to update the display screen.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, a field-programmable gate array (FPGA), a programmable logic unit (PLU), a microprocessor or any other device capable of responding to and executing instructions in a defined manner. The processing device may run an OS and one or more software applications that run on the OS. The processing device may also access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or one or more combinations thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and/or digital versatile discs (DVDs); magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the embodiments have been described with reference to the limited drawings, a person skilled in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a sensor portion comprising one or more sensors;
a display comprising a touch sensor;
one or more processors comprising processing circuitry; and
memory, comprising one or more storage media, storing instructions,
wherein the instructions, when executed by the one or more processors individually or collectively, cause the electronic device to:
sense a touch input through the touch sensor,
determine whether the touch input is valid based on state information generated through the one or more sensors when the touch input is sensed,
when it is determined that the touch input is valid, determine a target level of responsiveness to the touch input among a plurality of levels based on at least one of the state information and application information on an application executed by the electronic device, the application information comprising performance requirements for executing the application, and
control the electronic device based on the target level.

2. The electronic device of claim 1,
wherein the sensor portion comprises one or more of an acceleration sensor and a gyro sensor,
wherein the state information comprises one or more of a sensor value of the acceleration sensor and a sensor value of the gyro sensor, and
wherein the instructions, when executed by the one or more processors individually or collectively, further cause the electronic device to:
determine a current state of the electronic device based on the state information, and
determine that the touch input is not valid when the current state corresponds to a preset first state.

3. The electronic device of claim 2, wherein the instructions, when executed by the one or more processors individually or collectively, further cause the electronic device to, when it is determined that the touch input is valid and the current state corresponds to a preset second state, determine the target level corresponding to the preset second state among the plurality of levels.

4. The electronic device of claim 2,
wherein the sensor portion further comprises one or more of a proximity sensor and an illuminance sensor, and
wherein the state information further comprises one or more of a sensor value of the proximity sensor and a sensor value of the illuminance sensor.

5. The electronic device of claim 2, wherein the instructions, when executed by the one or more processors individually or collectively, further cause the electronic device to:
determine whether a display screen of the display is updated by the touch input when the current state does not correspond to the preset first state; and
determine that the touch input is not valid when the display screen is not updated.

6. The electronic device of claim 1, further comprising:
a camera sensor,
wherein the instructions, when executed by the one or more processors individually or collectively, further cause the electronic device to:
determine a current state of the electronic device based on the state information,
generate an image based on the camera sensor when the current state corresponds to a preset first state,
determine whether eyes of a user are comprised in the image, and
determine that the touch input is valid when the eyes of the user are comprised in the image.

7. The electronic device of claim 1, wherein the instructions, when executed by the one or more processors individually or collectively, further cause the electronic device to determine whether the touch input is valid further based on touch inputs received prior to the touch input.

8. The electronic device of claim 1, wherein the instructions, when executed by the one or more processors individually or collectively, further cause the electronic device to:
determine a rate at which a display screen of the display is updated while the electronic device is controlled at the target level; and
control the electronic device at a level higher than the target level when a rate at which the display screen is updated is less than a preset target rate.

9. The electronic device of claim 8, wherein the target rate is associated with an application running on the electronic device to update the display screen.

10. The electronic device of claim 1, wherein the instructions, when executed by the one or more processors individually or collectively, further cause the electronic device to control the electronic device by adjusting usage of hardware resources of the electronic device to correspond to the target level.

11. The electronic device of claim 1, wherein the electronic device is a mobile communication terminal.

12. A method, performed by an electronic device, of controlling an electronic device, the method comprising:
sensing a touch input through a touch sensor;
determining whether the touch input is valid based on state information generated through one or more sensors when the touch input is sensed;
when it is determined that the touch input is valid, determining a target level of responsiveness to the touch input among a plurality of levels based on at least one of the state information and application information on an application executed by the electronic device, the application information comprising performance requirements for executing the application; and
controlling the electronic device based on the target level.

13. The method of claim 12,
wherein the state information comprises one or more of a sensor value of an acceleration sensor and a sensor value of a gyro sensor, and
wherein the determining of whether the touch input is valid comprises:
determining a current state of the electronic device based on the state information, and
determining that the touch input is not valid when the current state corresponds to a preset first state.

14. The method of claim 13, wherein the determining the target level of responsiveness to the touch input comprises:
when the current state corresponds to a preset second state, determining the target level corresponding to the preset second state among the plurality of levels; and
when the current state does not correspond to the preset second state, determining the target level corresponding to the current state.

15. The method of claim 13, wherein the determining whether the touch input is valid further comprises:
determining whether a display screen of a display is updated by the touch input when the current state does not correspond to the preset first state; and
determining that the touch input is not valid when the display screen is not updated.

16. The method of claim 12, wherein the determining of whether the touch input is valid comprises:
determining a current state of the electronic device based on the state information;
generating an image based on a camera sensor when the current state corresponds to a preset first state;
determining whether eyes of a user are comprised in the image;
determining that the touch input is valid when the eyes of the user are comprised in the image; and
determining that the touch input is valid when the eyes of the user are comprised in the image.

17. The method of claim 12, further comprising:
determining a rate at which a display screen of a display is updated while the electronic device is controlled at the target level; and
controlling the electronic device at a level higher than the target level when a rate at which the display screen is updated is less than a preset target rate.

18. The method of claim 17, wherein the target rate is associated with an application running on the electronic device to update the display screen.

19. The method of claim 12, wherein the controlling the electronic device based on the target level comprises:
controlling the electronic device by adjusting usage of hardware resources of the electronic device to correspond to the target level.

20. A non-transitory computer-readable storage medium storing instructions that, when executed by a processor, cause the processor to perform a method of:
sensing a touch input through a touch sensor;
determining whether the touch input is valid based on state information generated through one or more sensors when the touch input is sensed;
when it is determined that the touch input is valid, determining a target level of responsiveness to the touch input among a plurality of levels based on at least one of the state information and application information on an application executed by an electronic device, the application information comprising performance requirements for executing the application; and
controlling the electronic device based on the target level.

* * * * *